United States Patent
Nicolas et al.

(10) Patent No.: US 12,466,238 B2
(45) Date of Patent: Nov. 11, 2025

(54) COOLANT CIRCUIT FOR VEHICLE AND METHOD FOR CONTROLLING SUCH A CIRCUIT

(71) Applicant: Valeo Systemes Thermiques, Le Mesnil Saint-Denis (FR)

(72) Inventors: Bertrand Nicolas, Le Mesnil Saint-Denis (FR); Mohamed Yahia, Le Mesnil Saint-Denis (FR)

(73) Assignee: Valeo Systemes Thermiques, Le Mesnil Saint-Denis (FR)

( * ) Notice: Subject to any disclaimer, the term of this patent is extended or adjusted under 35 U.S.C. 154(b) by 651 days.

(21) Appl. No.: 17/640,949

(22) PCT Filed: Sep. 7, 2020

(86) PCT No.: PCT/FR2020/051543
§ 371 (c)(1),
(2) Date: Mar. 7, 2022

(87) PCT Pub. No.: WO2021/048491
PCT Pub. Date: Mar. 18, 2021

(65) Prior Publication Data
US 2022/0332169 A1   Oct. 20, 2022

(30) Foreign Application Priority Data
Sep. 9, 2019   (FR) ................... FR1909877

(51) Int. Cl.
*B60H 1/00*   (2006.01)
*B60H 1/14*   (2006.01)
(Continued)

(52) U.S. Cl.
CPC ..... *B60H 1/00921* (2013.01); *B60H 1/00271* (2013.01); *B60H 1/00278* (2013.01);
(Continued)

(58) Field of Classification Search
CPC ............ B60H 1/00921; B60H 1/00271; B60H 1/00278; B60H 1/00385; B60H 1/143;
(Continued)

(56) References Cited

U.S. PATENT DOCUMENTS 6,637,229 B1 *  10/2003  Forrest ................. B60H 1/3208
                                                          62/323.3
9,404,410 B2 *  8/2016  Nishikawa ................ F01P 7/04
(Continued)

FOREIGN PATENT DOCUMENTS

CN   104114961 A   10/2014
CN   104812601 A   7/2015
(Continued)

OTHER PUBLICATIONS

International Search Report and Written Opinion in corresponding International Application No. PCT/FR2020/051543, mailed Dec. 16, 2020 (12 pages).
(Continued)

*Primary Examiner* — Ljiljana V. Ciric
(74) *Attorney, Agent, or Firm* — Osha Bergman Watanabe & Burton LLP

(57) ABSTRACT

A method for controlling a thermal regulation circuit of a vehicle. The circuit includes first and second heat exchangers situated in series in a direction in which an air flow is intended to pass through each heat exchanger. The circuit also includes an additional heat exchanger situated upstream of the first heat exchanger with respect to the air flow. The circuit is configured to allow a refrigerant fluid to circulate through the first exchanger and also configured to allow a heat-transfer fluid to circulate through the second exchanger and through the additional exchanger. The method includes
(Continued)

Figure 1:
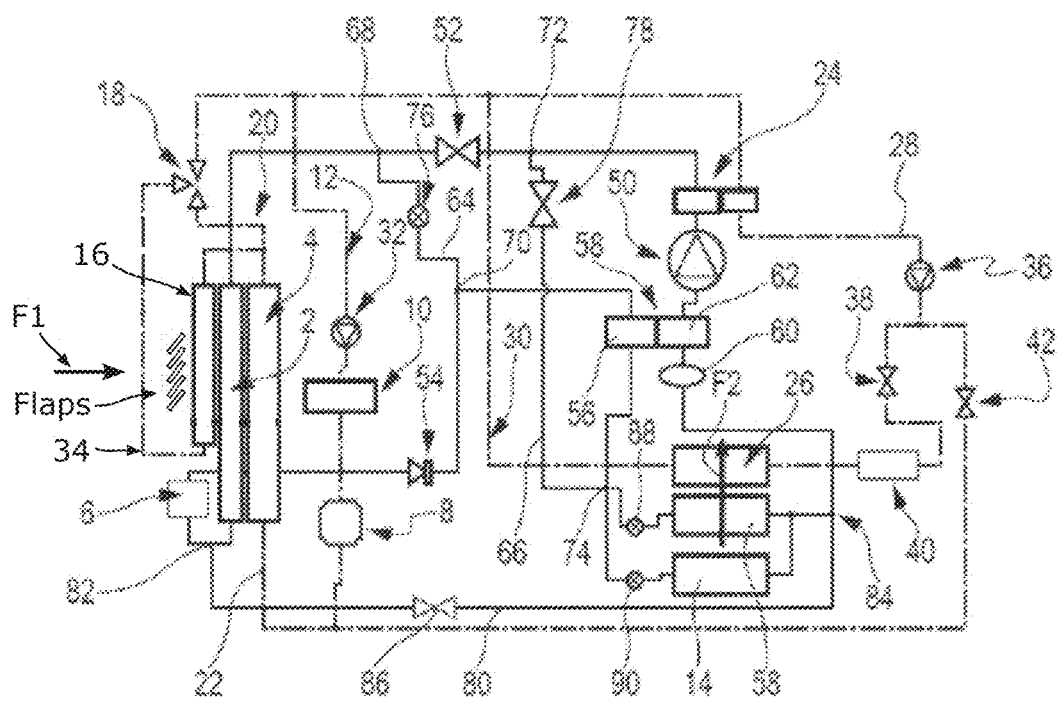

generating or increasing a flow rate of the heat transfer fluid in the additional exchanger depending on operating modes of the circuit.

10 Claims, 5 Drawing Sheets

(51) Int. Cl.
  *B60H 1/32* (2006.01)
  *B60K 11/08* (2006.01)
  *B60L 53/22* (2019.01)
  *H05K 7/20* (2006.01)

(52) U.S. Cl.
  CPC ......... *B60H 1/00385* (2013.01); *B60H 1/143* (2013.01); *B60H 1/3227* (2013.01); *B60K 11/085* (2013.01); *B60L 53/22* (2019.02); *H05K 7/20263* (2013.01); *H05K 7/20272* (2013.01); *H05K 7/20927* (2013.01); *B60H 2001/00078* (2013.01); *B60H 2001/00307* (2013.01); *B60H 2001/00928* (2013.01); *Y02T 10/70* (2013.01); *Y02T 10/88* (2013.01)

(58) Field of Classification Search
  CPC ........ B60H 1/3227; B60H 2001/00307; B60H 2001/00928; B60K 11/085; B60L 53/22; H05K 7/20263; H05K 7/20272; H05K 7/20927; Y02T 10/70
  See application file for complete search history.

(56) References Cited

U.S. PATENT DOCUMENTS

| | | | | |
|---|---|---|---|---|
| 10,099,531 | B2 * | 10/2018 | Labaste Mauhe | ..... B60H 1/321 |
| 10,216,258 | B1 * | 2/2019 | Hornback | ............ B60H 1/3208 |
| 12,326,292 | B2 * | 6/2025 | Akiki | ....................... F25D 21/08 |
| 2011/0214627 | A1 * | 9/2011 | Nishikawa | .............. F01P 7/165 |
| | | | | 123/41.02 |
| 2018/0086224 | A1 | 3/2018 | King | |
| 2019/0041968 | A1 * | 2/2019 | Hornback | ............... F01P 7/165 |
| 2022/0332169 | A1 * | 10/2022 | Nicolas | .................. B60H 1/143 |
| 2024/0042829 | A1 * | 2/2024 | Nicolas | ................ B60H 1/3211 |

FOREIGN PATENT DOCUMENTS

| | | | | |
|---|---|---|---|---|
| CN | 111532098 B | * | 5/2023 | ......... B60H 1/00007 |
| DE | 102017125170 A1 | * | 5/2019 | .......... H01M 10/613 |
| DE | 102017220376 A1 | | 5/2019 | |
| FR | 2984471 A1 | * | 6/2013 | ......... B60H 1/00007 |
| FR | 3117411 A1 | * | 6/2022 | |
| FR | 3120685 A1 | * | 9/2022 | ......... B60H 1/00278 |
| WO | 2014040854 A1 | | 3/2014 | |
| WO | 2015003894 A1 | | 1/2015 | |
| WO | WO-2018150110 A1 | * | 8/2018 | |

OTHER PUBLICATIONS

Office Action issued in counterpart Chinese appllication No. 202080062692.6, dated Jan. 9, 2024 (8 pages).

* cited by examiner

COOLANT CIRCUIT FOR VEHICLE AND METHOD FOR CONTROLLING SUCH A CIRCUIT

The field of the present invention is that of refrigerant circuits for vehicles, in particular for motor vehicles. The invention also relates to a method for controlling such a circuit.

Motor vehicles are currently equipped with a refrigerant circuit used to heat or cool various zones or various components of the vehicle. It is particularly known practice for this refrigerant circuit to be used to thermally treat an air flow sent into the interior of the vehicle.

In another application of this circuit, it is known practice to cool an electrical storage device used to supply energy to the components of an electric powertrain of the vehicle, particularly an electric motor, capable of causing said vehicle to move, and an associated electric converter, intended to convert the DC electrical current delivered by the electrical storage device into AC current for powering the electric motor. The refrigerant circuit thus provides the energy capable of cooling the electrical storage device when it is used during driving phases. The refrigerant circuit is thus designed to cool this electrical storage device for temperatures that remain moderate.

It is also known practice for the electrical storage device of the vehicle to be charged by connecting it for several hours to the domestic grid. This long charging technique allows the temperature of the electrical storage device to be kept below a certain threshold, which allows any system for cooling the electrical storage device to be dispensed with.

A rapid charging technique may also be employed. It involves charging the electrical storage device at a high voltage and amperage, so as to charge the electrical storage device over a short time of a few minutes. This rapid charging causes heating of the electrical storage device, which needs to be cooled. This heating governs the rating of the components because this is one of the situations that are the most severe in terms of the cooling power that has to be supplied. For example it involves having to be able to dissipate more than 17 kW even when the ambient air temperature might be high, for example 40° C.

Another factor in the rating of the device for conditions that are among the most severe in terms of the cooling power that has to be supplied is operation with a dissipated power equal, or close, to the maximum available power. This corresponds to conditions in which the ambient air temperature is high, namely 45° C., and the speed of the air flow available for cooling is 3 m/s. The temperature of a liquid coolant used for cooling the components of the electric powertrain of the vehicle is then required to be below a maximum permissible temperature Tmax (for example 70° C.) after the cooling of the electric converter.

In order to dissipate the heat that needs to be removed, each of the circuits comprises an exchanger intended for an exchange of heat between an external air flow and, respectively, the refrigerant fluid and the liquid coolant. In order to optimize thermal efficiency, the ideal would be for each exchanger to be able to have passing through it an ambient air flow, namely an air flow that has not already passed through another exchanger, the purpose of this being to avoid the temperature of the air flow passing through the exchanger then situated further downstream being higher than the ambient temperature as a result of having been heated by the exchanger upstream of it.

That said, in a vehicle, these exchangers, which incidentally are known as front-end exchangers, are generally positioned at the front of the vehicle, behind the radiator grille, and the surface area available is limited. It is therefore necessary to position the exchangers one behind another in the direction of circulation of the air flow, and only one of them, situated furthest upstream, will be able to benefit from the ambient air, the air flow passing through the one situated further downstream then being at a temperature higher than the temperature of the ambient air.

A first option is therefore to prioritize the cooling of the liquid-coolant circuit by positioning the associated front-end exchanger foremost, namely upstream according to the direction in which the air flow circulates. The cooling of the refrigerant fluid is then limited, and the components of that circuit, particularly the compressor thereof, then need to be oversized, in order to have the necessary cooling power available to them.

Another option is to prioritize the cooling of the refrigerant-fluid circuit by positioning the associated front-end exchanger foremost, namely upstream according to the direction in which the air flow circulates. That said, it is then the cooling of the heat-transfer fluid that is limited.

An alternative solution, corresponding to an unpublished patent application in the name of the applicant company, has been envisioned. This consists in sharing the foremost position between two exchangers, namely an exchanger associated with the refrigerant-fluid circuit and an exchanger associated with the liquid-coolant circuit, and in assigning second place to an exchanger dedicated to the refrigerant fluid. Although it affords a significant improvement, this solution can be improved still further.

The invention seeks to at least partially alleviate the aforementioned problems and to this end proposes, in a first aspect, a circuit for the thermal regulation of a vehicle, said circuit comprising a first and a second heat exchanger which are situated in series in a direction in which an air flow intended to pass through them in this order circulates, said circuit comprising a third heat exchanger through which an ambient air flow is intended to pass, said circuit being configured to allow a refrigerant fluid to circulate in series through the first and third exchangers and a heat-transfer fluid to circulate through the second exchanger.

What is meant by an "ambient air flow" is an air flow which has passed neither through the first exchanger nor through the second exchanger before passing through the third exchanger. In other words, the air flow concerned is at ambient temperature, namely at the temperature of the air outside the vehicle, when it passes through the third exchanger, because it has not been heated by another exchanger beforehand.

In that way, the invention provides a high level of heat dissipating power in relation to the refrigerant-fluid circuit, being able in particular to provide one or more operating points corresponding to severe conditions of use, such as the rapid charging of an energy storage device, and doing so by virtue of the third heat exchanger which supplements the dissipation power of the first exchanger, and doing so all the more effectively given that the third exchanger is intended to exchange heat with ambient air. At the same time, the heat-dissipation capabilities of the heat-transfer fluid circuit are maintained by virtue of the second exchanger which is able to have an increased frontal surface area in comparison with a situation in which it shares the available frontal surface area with another exchanger.

The circuit according to the invention can also comprise the following features, taken individually or according to any technically possible combination forming as many embodiments of the invention:

said circuit is configured so that the circulation of the heat-transfer fluid allows a cooling of one or more components of an electric powertrain of the vehicle, said circuit is configured so that the series circulation of the refrigerant fluid through the first and third exchangers provide so-called rapid cooling of an electrical energy storage device and/or thermal treatment of an interior of the vehicle.

said first and second heat exchangers are intended to be positioned on the front face of the vehicle, said first and second heat exchangers have substantially identical frontal surface areas, said third exchanger has a frontal surface area smaller than that of the first and/or second exchangers, said third exchanger is intended to be positioned on the front face of the vehicle, upstream of the first and second exchangers according to the direction of circulation of the air flow passing through them, said circuit comprises a fourth exchanger, configured to have the heat-transfer fluid passing through it, said circuit is configured to also selectively allow the heat-transfer fluid to circulate through the second exchanger and the heat-transfer fluid to circulate through the second and the fourth heat exchanger, the circulation of the heat-transfer fluid through the second heat exchanger and through the fourth heat exchanger is in series, the third exchanger and the fourth exchanger are positioned side-by-side in the direction of circulation of the air flow, said third exchanger and said fourth exchanger, considered together, have a frontal surface area substantially identical to the frontal surface area of said first and/or of said second heat exchanger, said circuit comprises at least one valve for directing the heat-transfer fluid downstream of the second exchanger selectively, according to the direction of circulation of said heat-transfer fluid, toward said fourth exchanger or toward the component or components of the electric powertrain of the vehicle, said circuit is configured to selectively allow the refrigerant fluid to circulate through the first exchanger, or the refrigerant fluid to circulate in series through the first and third exchangers, said circuit is configured so that circulation of the refrigerant fluid through the first heat exchanger provides so-called operational cooling of the electrical storage device and/or thermal treatment of an interior of the vehicle, said circuit comprises a fifth exchanger, referred to as a bi-fluid heat exchanger, configured to allow an exchange of heat between said refrigerant fluid and said heat-transfer fluid, said circuit comprises a heating radiator intended to have the heat-transfer fluid passing through it, said circuit being configured so that the heat-transfer fluid circulating through the bi-fluid exchanger circulates through said radiator, in at least one mode of operation of said circuit, said circuit is configured so that, in at least one mode of operation, said fifth exchanger is situated upstream of said first exchanger in the direction of circulation of the refrigerant fluid, said circuit comprises a bottle configured for separating the vapor phase and the liquid phase of said refrigerant fluid, said bottle is incorporated into said first exchanger, said bottle is situated between said first and said third exchanger, in the direction of circulation of the refrigerant fluid.

In another aspect of the invention, the applicant has noted that, given the different times at which the rapid charging of the battery and the conditions of operation at maximum power occur, there is another approach that can be taken for optimizing the dissipation of heat.

Thus, according to another aspect of the invention, the invention relates to a method for controlling a circuit for the thermal regulation of a vehicle, said circuit comprising a first and a second heat exchanger which are situated in series in a direction in which an air flow intended to pass through them in this order circulates, said circuit further comprising an additional heat exchanger situated upstream of the first heat exchanger according to the direction of circulation of the air flow, said circuit being configured to allow a refrigerant fluid to circulate through the first exchanger and a heat-transfer fluid to circulate through the second exchanger and through the additional exchanger, said method comprising a step in which a flow of the heat-transfer fluid in the additional exchanger is generated or increased according to the mode of operation of the circuit.

In other words, according to this aspect of the invention, the heat exchanger that is situated foremost, namely the additional heat exchanger, does not always have the heat-transfer fluid passing through it. It therefore does not heat the incident air flow. It is therefore possible to maintain a good heat-dissipation capability for the refrigerant fluid when the additional heat exchanger does not have the heat-transfer fluid passing through it, for example when the vehicle is stationary and the vehicle electrical storage device needs to be cooled. Conversely, when the additional heat exchanger does have the heat-transfer fluid passing through it, the dissipation power afforded by the heat-transfer fluid is optimized and allows the cooling of the vehicle powertrain, even under the most severe conditions such as operation at maximum power.

The method according to the invention can also comprise the following features, taken individually or according to any technically possible combination forming as many embodiments of the invention:

said circuit is configured in such a way that the air flow passing through said additional heat exchanger is an ambient air flow, said method comprises a step of controlling at least one parameter relating to the heat-transfer fluid, said parameter is the temperature of the heat-transfer fluid, the step in which the flow of the heat-transfer fluid in the additional exchanger is generated or increased is performed according to a value of said parameter, the step in which the flow of the heat-transfer fluid in the additional exchanger is generated or increased is performed by comparing the value of the parameter against a threshold value, said circuit is configured so that the circulation of the heat-transfer fluid allows a cooling of one or more components of an electric powertrain of the vehicle, said circuit is configured so that the circulation of the heat-transfer fluid allows a cooling of an electric converter intended to convert a DC electric current delivered by an electrical storage device into an AC current for powering an electric motor capable of causing said vehicle to move, the step in which the flow of the heat-transfer fluid in the additional exchanger is generated or increased occurs if the temperature of the heat-transfer fluid is slightly below, equal to or greater than the maximum permissible temperature Tmax, said method comprises a step of selectively allowing a circulation of the heat-transfer fluid through the second exchanger and a circulation of the heat-transfer fluid through the second exchanger and through the additional heat exchanger, said circuit comprises at least one valve for directing the heat-transfer fluid downstream of the second exchanger selectively, according to the direction of circulation of said heat-transfer fluid, toward said additional heat exchanger or toward the component or components of the electric powertrain of the vehicle, said step in which the flow of the heat-transfer fluid in the additional exchanger is generated or increased comprises a step of opening/closing said valve, in an all-or-nothing mode and/or partially, said valve is formed by a thermostat and/or by an electronically controlled valve, the circulation of the heat-transfer fluid through the second heat exchanger and through the additional heat exchanger is in series, said first and second heat exchangers have substantially identical frontal surface areas, said additional exchanger has a frontal surface area smaller than or equal to that of the first and/or second exchangers, said first and second heat exchangers as well as said additional exchanger are intended to be positioned on the front face of the vehicle, the cooling fluid is cooled in the following sub-steps:
- a sub-step (a) wherein said air flow is generated and/or accelerated using a motor-fan unit, and/or a sub-step (b) wherein a cross section for the passage of said air flow is increased by opening one or more mobile flaps or shutters intended to limit a flow rate of said air flow,
- a sub-step (c) wherein the flow of the heat-transfer fluid through said additional heat exchanger is generated and/or increased.

the order of said sub-steps is modified according to the speed of the vehicle, when the vehicle speed is above a threshold speed, there is an envisioned initial situation in which the flaps or shutters are closed so that the cross section for the passage of said air flow is nil or minimal when the vehicle speed is above the threshold speed, sub-step (c) is performed first of all, followed by sub-step (b) if that is still not enough to achieve a required setpoint when the vehicle is stationary and/or when the vehicle speed is below the threshold speed, sub-step (a) is performed first of all, and then, if that is still not enough to achieve a required setpoint, sub-step (c) is performed, when the vehicle is stationary and/or when the vehicle speed is below the threshold speed, sub-step (b) is performed if the setpoint has not been achieved at the end of sub-step (a), and then sub-step (c) is performed, if the setpoint has not been achieved at the end of sub-step (b), the load on a refrigerant-fluid circulation loop is reduced if the setpoint is not achieved despite implementation of sub-steps (a), (b) and (c), said threshold speed of the vehicle is adapted according to the ambient temperature, said circuit comprises an exchanger, known as a bi-fluid exchanger, configured to allow an exchange of heat between said refrigerant fluid and said heat-transfer fluid, said circuit comprises a heating radiator intended to have the heat-transfer fluid passing through it, said circuit being configured so that the heat-transfer fluid circulating through the bi-fluid exchanger circulates through said radiator, in at least one mode of operation of said circuit, said circuit is configured so that, in at least one mode of operation, the bi-fluid exchanger is situated upstream of said first exchanger in the direction of circulation of the refrigerant fluid, said circuit comprises a bottle configured for separating the vapor phase and the liquid phase of said refrigerant fluid, said bottle is incorporated into said first exchanger.

This aspect of the invention can be combined with the first aspect of the invention. Said circuit then comprises the third heat exchanger as described above. In addition, the additional heat exchanger corresponds to the fourth exchanger of said first aspect of the invention.

The invention also relates to a heat exchange module comprising the first, the second as well as the third heat exchanger and/or the fourth exchanger, namely the additional heat exchanger of the circuit described above. Advantageously, said module further comprises the valve that allows the selective directing of the heat-transfer fluid downstream of the second exchanger.

Figure 2:
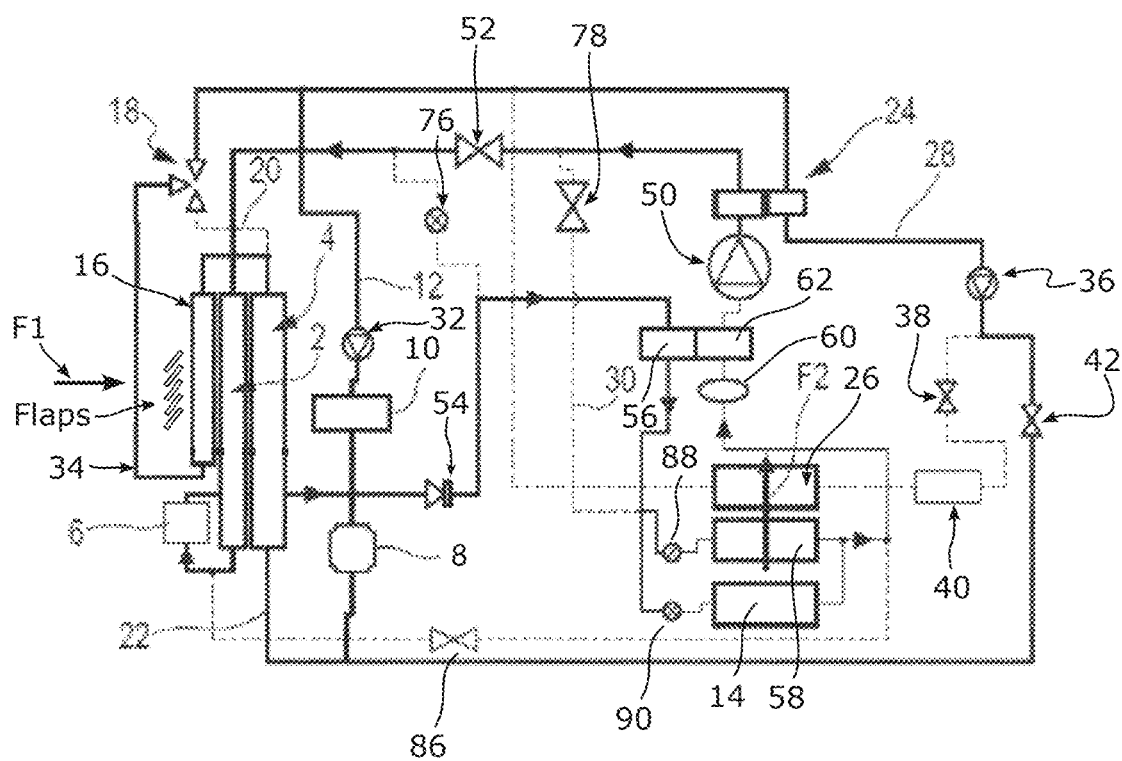

Further features and advantages of the invention will become apparent from reading the following detailed description, for an understanding of which reference is made to the appended drawings, in which:

FIG. 1 schematically illustrates one exemplary embodiment of a first circuit according to the invention comprising a loop for the circulation of a refrigerant fluid and a loop for the circulation of a heat-transfer fluid, FIG. 2 schematically illustrates the circulation of the various fluids according to a first mode of operation of the circuit of FIG. 1

Figure 3:
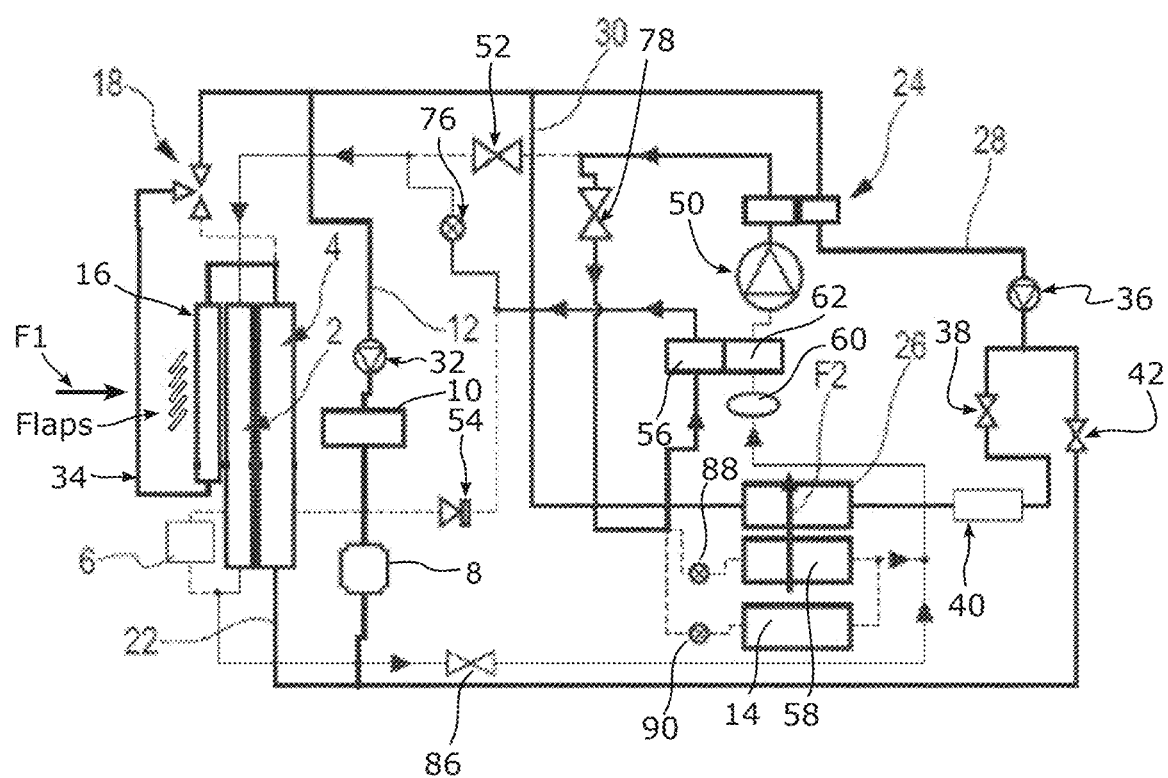

FIG. 3 schematically illustrates the circulation of the various fluids according to a second mode of operation of the circuit of FIG. 1

Figure 4:
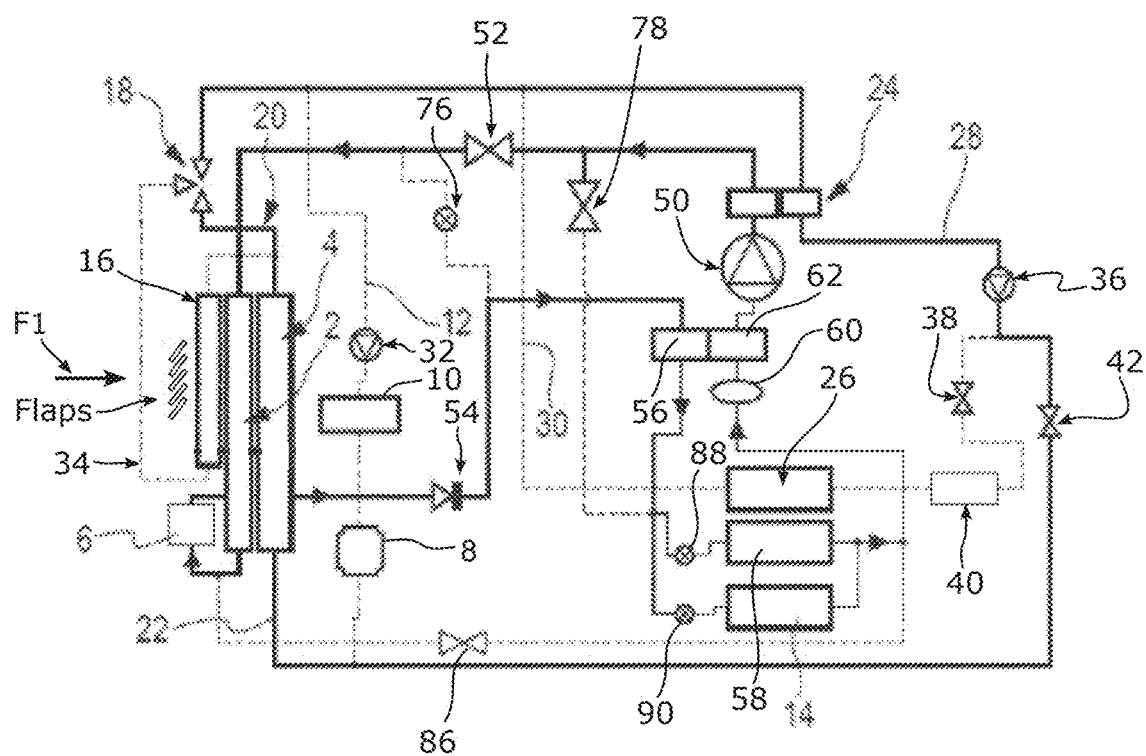

FIG. 4 schematically illustrates the circulation of the various fluids according to a third mode of operation of the circuit of FIG. 1

Figure 5:
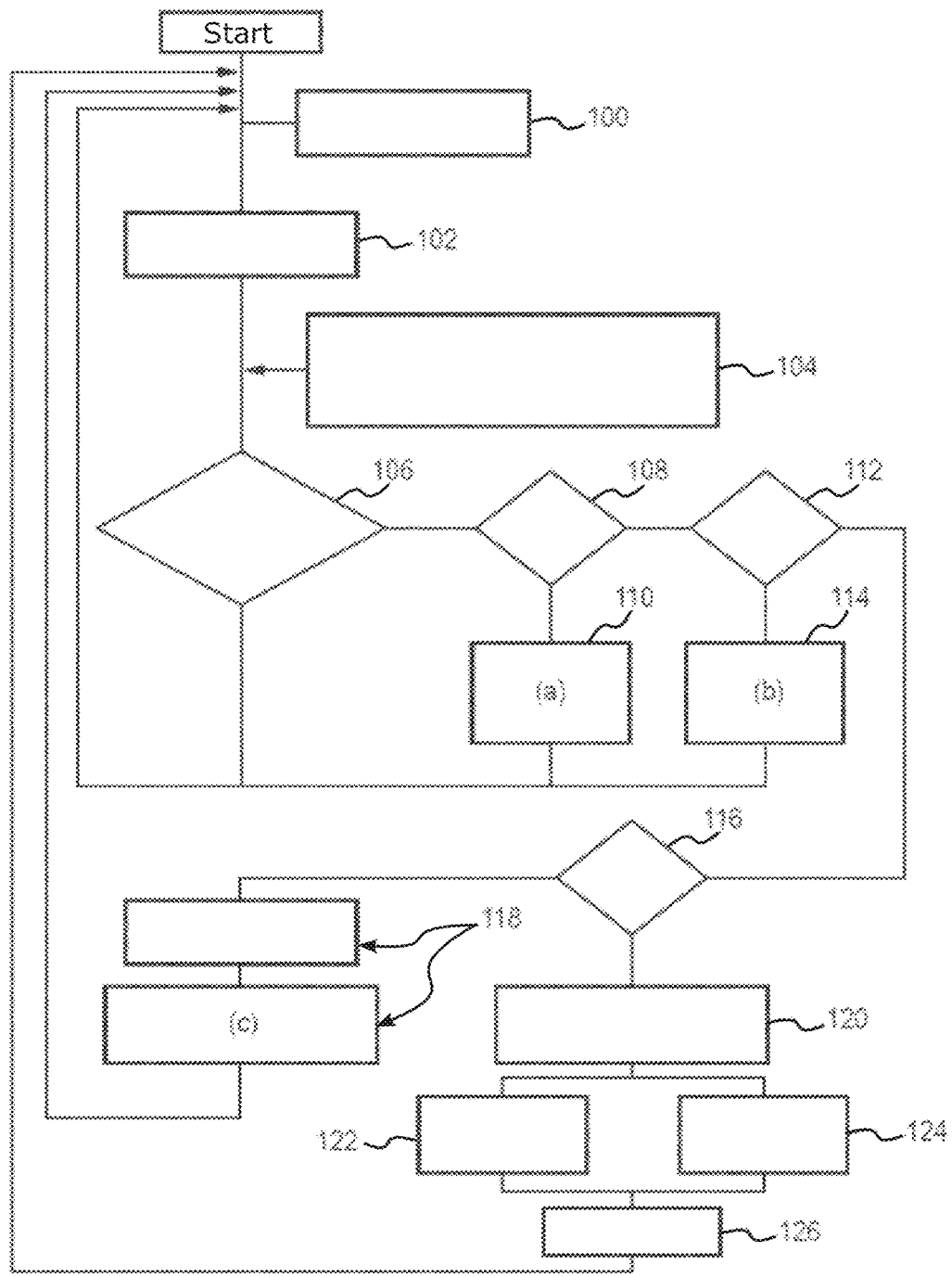

FIG. 5 is a flow diagram illustrating one exemplary embodiment of a control method according to the invention.

As illustrated in FIGS. 1 to 4, the invention relates to a thermal regulation circuit for a vehicle, particularly a motor vehicle. It comprises in this instance a loop, particularly a closed loop, for the circulation of a refrigerant fluid and a loop, particularly a closed loop, for heat-transfer fluid.

The terms upstream and downstream used in the following description refer to the direction of circulation of the fluid in question, that is to say the refrigerant fluid, the heat-transfer fluid, a flow of air external to an interior of the vehicle and/or an interior air flow sent to the interior of the vehicle.

In FIG. 1, the refrigerant-fluid loop is illustrated in solid line and the heat-transfer fluid loop is illustrated in chain line. In FIGS. 2 to 4, for each of the loops, the portions through which their respective fluid is passing are shown in solid line and the portions without circulating fluid are shown in dotted line. Moreover, the circulation of the refrigerant fluid is illustrated with its direction of circulation indicated by arrows. Use is also made of solid line of different line thicknesses. More specifically, the thickest lines correspond to high-pressure portions, the intermediate-thickness lines correspond to intermediate portions and the thinnest lines correspond to low-pressure portions of the refrigerant-fluid loop.

The identifiers "first", "second", etc. used hereinafter are not intended to indicate a level of hierarchy of or to order the terms they accompany. These identifiers serve to distinguish the terms which they accompany and can be interchanged without narrowing the scope of the invention.

The refrigerant fluid is, for example, a fluid capable of transitioning from a liquid phase to a gas phase and vice versa under the temperature and pressure conditions of the circuit. It may be a fluid known by the name of R134a or a fluid known by the name of R1234yf. It may even be a fluid that remains essentially in the gaseous state, such as R744.

The heat-transfer fluid is, for example, a liquid, notably water with the addition of an antifreeze such as glycol.

Said circuit comprises a first heat exchanger 2, a second heat exchanger 4 and a third heat exchanger 6. Said circuit is configured to allow the refrigerant fluid to circulate in series through the first and third exchangers 2 and 6, and the heat-transfer fluid to circulate through the second exchanger 4. In other words, in this instance, the first and third exchangers are in the refrigerant-fluid circulation loop and the second exchanger 4 is in the heat-transfer fluid loop.

Furthermore, the first exchanger 2 and the third exchanger 6 are situated in series in a direction of circulation of an air flow, illustrated by an arrow identified F1, which flow is intended to pass through them in that order. For its part, the third heat exchanger 6 is intended to have passing through it an ambient air flow, in other words air that has not yet been heated by the first and/or the second exchangers 2 and/or 4. As will be detailed later on, in the embodiment illustrated, this is the same air flow F1 as passes through the first and second exchangers 2, 4, the air flow F1 therefore passing, in this order, through the third exchanger 6, the first exchanger 2 and the second exchanger 4.

By placing the first and third heat exchangers 2 and 6 in series with respect to the refrigerant fluid, a high heat-dissipation power is obtained, especially when the third exchanger 6 has fresh air passing through it and therefore cools the refrigerant fluid all the more effectively. The latter fluid can thus be used to cool various components or regions of the vehicle, even under the most severe conditions of use of the circuit. Furthermore, the second exchanger 4 can be used for cooling other components using the heat-transfer fluid, this being with the possibility of exhibiting a large frontal surface area because it is situated downstream of the first exchanger 2 in the direction of circulation of the air flow. This frontal surface area therefore does not interfere with that of the third exchanger 6 which is positioned either upstream of the first exchanger 2 in the direction of circulation of the air flow or elsewhere in the vehicle provided that it can have an ambient air flow passing through it.

As will be expanded upon later on, the circuit may be configured so that the passage of the refrigerant fluid in series through the first and third exchangers 2 and 6 does not occur systematically but only in certain modes of operation. Such is the case in the example illustrated, in which series circulation occurs in the modes of operation of FIGS. 2 and 4 but not in the mode of operation of FIG. 3.

The first exchanger 2 is formed for example of a gas cooler or condenser. The third exchanger 6 is configured, for example, to perform supercooling of said refrigerant fluid after it has passed through the gas cooler or condenser. These may, for example, the exchangers comprising a heat exchange core bundle of tubes and fins. The tubes are intended for the circulation of the refrigerant fluid. The fins are in contact with the tubes and are intended to have the air flow pass through them. Said condenser has one or more passes for the circulation of the refrigerant fluid.

Said circuit is configured here so that the circulation of the heat-transfer fluid can be used, for example, to cool one or more components of an electric powertrain of the vehicle, such as an electric motor 8, capable of causing said vehicle to move, and an associated electric converter 10, intended to convert the DC electrical current delivered by an electrical storage device into AC current for powering the electric motor 8. To do that, the heat-transfer fluid circulation loop advantageously comprises a first leg 12 passing in this order according to the direction of circulation of the heat-transfer fluid through the electric converter 10 and the electric motor 8. As an alternative, the converter 10 and/or the motor 8 do not have the heat-transfer fluid passing through them directly, but are passed through by an auxiliary fluid, said auxiliary fluid exchanging heat with the heat-transfer fluid by means of a heat exchanger connected to the component concerned by a specific auxiliary-fluid circulation loop.

In the embodiment illustrated, such cooling occurs in the mode of operation illustrated in FIG. 2.

Said circuit is furthermore in this instance configured so that circulation in series of the refrigerant fluid through the first and third exchangers 2 and 6 provides so-called rapid cooling of the electrical energy storage device and/or thermal treatment of an interior of the vehicle. The electrical energy storage device is not depicted as such. It may be in direct contact with a component of the refrigerant-fluid circulation loop such as a cooler 14. As an alternative, it may be cooled by an auxiliary fluid, itself exchanging heat with the refrigerant fluid, for example by means of said cooler 14. In the embodiment illustrated, the associated mode of operation, referred to as rapid cooling of the electrical energy storage device, is encountered, FIG. 4.

As a preference, said first and second heat exchangers 2, 4 are intended to be positioned on the front face of the vehicle, for example behind the radiator grille thereof. They advantageously have substantially identical frontal surface areas, particularly so that each can occupy the largest available area. What is meant by frontal surface area is the surface area of the exchanger in a plane perpendicular to the air flow F1, namely in a plane substantially parallel to the radiator grille.

Advantageously, as already mentioned, said third exchanger 6 is also intended to be positioned on the front face of the vehicle and have the air flow F1 passing through it. It is therefore situated upstream of the first and second exchangers 2 and 4, in the direction of circulation of the air flow.

With such a location, said third exchanger 6 has a frontal surface area smaller than that of the first and/or second exchangers 2, 4. That said, this feature could also apply when the third exchanger 6 is sited at another location. In this regard, said third exchanger 6 may be situated, for example, in a wheel arch. Its frontal surface area is then tailored to the space available.

Advantageously, said circuit comprises a fourth exchanger 16 which in this instance is positioned next to the third exchanger 6 so that the third and fourth exchangers 6 and 16 have said air flow F1 passing through them in parallel. Said air flow F1 may be manipulated by a motor-fan unit and/or by one or more mobile flaps or shutters intended to limit rate of said air flow. As a preference, said third exchanger 6 and said fourth exchanger 16, considered together, have a frontal surface area substantially identical to the frontal surface area of said first and second heat exchangers 2 and 4.

The second exchanger 4 is formed, for example, of a cooling radiator. It may be qualified as a low-temperature radiator. The fourth exchanger 16 is configured, for example, to perform additional cooling of said heat-transfer fluid. It may be qualified as a very-low-temperature exchanger. These may, for example, be exchangers comprising a heat exchange core bundle of tubes and fins. The tubes are intended for the circulation of the cooling fluid. The fins are in contact with the tubes and are intended to have the air flow pass through them.

Said circuit is configured to also selectively allow the heat-transfer fluid to circulate through the second exchanger 4, without passing through the fourth exchanger 16, as is the case in FIG. 4, and the heat-transfer fluid to circulate through the second and the fourth heat exchangers 4 and 16, as is the case in FIGS. 2 and 3. In other words, in this instance, said fourth exchanger 16 is incorporated into the heat-transfer fluid circulation loop. When there is no circulation of heat-transfer fluid in the fourth exchanger 16, this promotes the effectiveness of the first exchanger 2 because the air flow passing through the latter is then an air flow at ambient temperature, at least over that portion of said first exchanger 2 that lies facing the fourth exchanger 16. When the heat-transfer fluid is circulating both through the second exchanger 4 and the fourth exchanger 16, this promotes greater capacity for the heat-transfer fluid circulation loop to dissipate heat at the front face, especially when the fourth exchanger 16 has passing through it a flow of ambient air, as in the embodiment illustrated.

The circulation of the heat-transfer fluid through the second heat exchanger 4 and through the fourth heat exchanger 16 is, in this instance, in series. As an alternative, it is in parallel.

Said circuit further comprises at least one valve 18 for directing the heat-transfer fluid downstream of the second exchanger 4 selectively, according to the direction of circulation of said heat-transfer fluid, toward said fourth exchanger 16, as in FIGS. 2 and 3, or directly toward the rest of the circuit, as in FIG. 4. This is, for example, a three-way valve, in this instance having a first inlet, a second inlet, and a common outlet.

Said first inlet is connected, for example, to a portion 20 of a second leg 22 of the coolant-fluid circulation loop comprising said second exchanger 4, said portion 20 allowing said fourth exchanger 16 to be bypassed after exiting the second exchanger 4. Said second inlet is connected to the fourth heat exchanger 16. Said common outlet is connected in particular to the first leg 12 of said cooling-fluid circulation loop.

As an alternative, said valve 18 comprises a common inlet, a first outlet and a second outlet. The inlet is then connected to the second exchanger 4, the first outlet to the portion 20 of the second leg 22 of the cooling-fluid circulation loop, and the second outlet to the fourth heat exchanger 16.

Said valve 18 is notably formed of a thermostat and/or of an electronically controlled valve allowing communication to be established selectively between the first and/or the second inlet of said valve and the common outlet and/or between the common inlet and the first and/or the second outlet.

As mentioned above, as a preference, said circuit is configured to allow the refrigerant fluid to circulate selectively through the first exchanger 2 without passing through the third exchanger 6, as in FIG. 3, or the refrigerant fluid to circulate in series through the first and third exchangers 2 and 6, as in FIGS. 2 and 4. In that way, it is possible for the third exchanger 6 not to be used systematically, this potentially being advantageous for limiting the pressure drops in the refrigerant-fluid loop when the need to dissipate heat is limited.

Such a mode of operation is for example employed for so-called operational cooling of the electrical storage device, which is to say cooling that requires less dissipation of heat than is required in the case of rapid recharging, and/or for a thermal treatment of the interior of the vehicle. Such is, for example, the case for operation in heat-pump mode, as in FIG. 3. In such an embodiment, according to the embodiment illustrated, heat energy is taken from the air flow F1 passing through the first exchanger 2 and restored, as will be expanded upon later, to an air flow illustrated as F2 that is intended to enter the vehicle interior in order to heat same. Said circuit is thus configured so that the circulation of the refrigerant fluid through the first heat exchanger 2 without passing through the third exchanger 6 allows such a result to be achieved.

As a preference, said circuit comprises a fifth exchanger 24, known as a bi-fluid exchanger, configured to allow an exchange of heat between said refrigerant fluid in said heat-transfer fluid. Such an exchanger is therefore positioned both in the refrigerant-fluid loop and the cooling-fluid loop. This is, for example, a condenser, notably a condenser of the stacked plates type.

As a preference, said circuit, particularly said heat-transfer fluid circulation loop, comprises a heating radiator 26 through which the heat-transfer fluid is intended to pass. Said circuit is configured so that the heat-transfer fluid circulating in the bi-fluid exchanger 24 circulates through said heating radiator 26, according to at least one mode of operation of said circuit, notably the heat-pump mode mentioned above.

In this mode, as illustrated in FIG. 3, the heat energy is taken from the air flow F1 passing through the first exchanger 2 and transmitted by said exchanger 2 to the refrigerant fluid. This energy is therefore transmitted to the cooling fluid by said fifth exchanger 24 and to the air flow F2 intended to enter the vehicle interior by the heating radiator 26.

As a preference, said circuit is configured so that, in at least one mode of operation, said fifth exchanger 24 is situated upstream of said first exchanger 2 according to the direction of circulation of the refrigerant fluid. The modes of operation involved are, for example, an air conditioning mode encountered in FIG. 2 according to the embodiment illustrated, and/or the mode of rapid cooling of the electrical energy storage device (remember this is illustrated in FIG. 4). Thus, in the modes concerned, the refrigerant fluid experiences all of the following: a pre-cooling in the fifth exchanger 24, a cooling, possibly with change of phase, in the first exchanger 2 and, if necessary, a supercooling in the third exchanger 6. The change in enthalpy of the refrigerant fluid is therefore optimized, making it possible to limit the amount of power that has to be supplied to the refrigerant-fluid loop, for the same performance.

Said circuit may comprise a bottle, not illustrated, configured for separating the vapor phase and the liquid phase of said refrigerant fluid. Said bottle is, for example, incorporated into said first exchanger 2 which may, or may not, then comprise one or more supercooling passes within its core bundle. This supercooling combines with the cooling supplied by the third exchanger 6 in the modes of operation in which series circulation through the first and third exchangers 2 and 6 occurs. As an alternative, said bottle is situated between said first and third exchangers 2 and 6, in the direction of circulation of the refrigerant fluid. Said bottle is advantageously furnished with a filter and/or with a desiccant.

According to the embodiment illustrated, the cooling-fluid circulation loop comprises the first leg 8 and the second leg 22 already mentioned, as well as a third leg 28 and a fourth leg 30, all of said legs 12, 22, 28, 30 running parallel with one another.

The first leg 12 comprises the electric converter 10 and the electric motor 8. It further comprises a first pump 32 for circulating the cooling fluid.

The second leg 22 comprises the second exchanger 4 and the three-way valve 18. In parallel with its portion 20, it further comprises a sub-leg 34 equipped with said fourth exchanger 16.

The third leg 28 comprises the bi-fluid exchanger 26 and a second pump 36 for circulating the heat-transfer fluid.

The fourth leg 30 comprises a first two-way valve 38 and the heating radiator 26. In this instance it further comprises an electrical heating device 40 for heating the cooling fluid, and which is intended to be used in combination with the heating radiator 26, if need be.

Said cooling-fluid circulation loop may further comprise a second two-way valve 42, situated between, on the one hand, the first and second legs 12 and 22 and, on the other hand, the third and fourth legs 28 and 30 on the downstream side of the second pump 36.

Said circuit, particularly said refrigerant fluid circulation loop, comprises a compression device 50 allowing said refrigerant fluid to be circulated. It will be noted that the compression device 50 can take the form of an electric compressor, that is to say a compressor which comprises a compression mechanism, an electric motor and possibly a controller.

Downstream of said compression device 50, said refrigerant-fluid circulation loop comprises said bi-fluid exchanger 24, a third two-way valve 52, said first exchanger 2, said third exchanger 6, a non-return valve 54, a first pass 56 of an internal exchanger 58 and, in parallel with one another in respective legs, an evaporator 58 and the cooler 14, and then an accumulator 60 and a second pass 62 of the internal exchanger 58. These components succeed one another in this order in a sub-loop through which the refrigerant fluid returns to the compression device 50 after having passed through the second pass 62 of the internal exchanger 58.

Said circuit further comprises a first, a second and a third bypass leg 64, 66 and 80, for modifying the path of the refrigerant fluid.

The first bypass leg 64 is situated between a first point of divergence 68 and a first point of convergence 70. The first point of divergence 68 is situated between the third two-way valve 52 and the first exchanger 2. The first point of convergence 70 is situated between the non-return valve 54 and the first pass 56 of the internal exchanger 58. Said first bypass leg 64 comprises a first expansion member 76. Said expansion member is configured to selectively completely open said first bypass leg 64, completely close said first bypass leg 64, or expand the refrigerant fluid circulating through said first bypass leg 64.

The second bypass leg 66 is situated between a second point of divergence 72 and a second point of convergence 74. The second point of divergence 72 is situated between the bi-fluid exchanger 24 and the third two-way valve 52. The second point of convergence 74 is situated between the first pass 56 of the internal exchanger 58 and a portion, in this instance a point, of the above-mentioned sub-loop allowing the evaporator 58 and the cooler 14 to be supplied in parallel. Said second bypass leg 66 comprises a fourth two-way valve 78.

The third bypass leg 80 is situated between a third point of divergence 82 and a third point of convergence 84. The third point of divergence 82 is situated between the first exchanger 2 and the third exchanger 6. The third point of convergence 84 is situated between, on the one hand, a portion, in this instance a point, of the above-mentioned sub-loop allowing the refrigerant fluid leaving the evaporator 58 and leaving the cooler 14 to be collected in parallel and, on the other hand, the accumulator 60. Said third bypass leg 80 comprises a fifth two-way valve 86.

The refrigerant-fluid circulation loop further comprises a second and a third expansion member 88 and 90, these respectively being situated upstream of the evaporator 58 and of the cooler 14 in the associated legs. Said expansion members are configured to selectively completely open said legs, completely close said legs, or expand the refrigerant fluid circulating through said legs.

According to the mode of operation illustrated in FIG. 2, the circuit provides both an air conditioning mode and a mode in which the heat released by the component or components 8, 10 of the electric powertrain of the vehicle is dissipated in such a way as to cool the cooling fluid to below the maximum permissible temperature Tmax downstream of the converter 10, even in conditions of use such as operation at maximum power.

In this mode of operation, the cooling fluid circulates in the first leg 12, the second leg 22, passing via the sub-leg 34, and in the third leg 28, but does not circulate through the fourth leg 30. The three-way valve 18 is open so as to cause the cooling fluid to circulate through the fourth exchanger 16, as explained above. The first two-way valve 38 is closed. The second two-way valve 42 is open. The first and/or second pumps 32, 36 are active. Thus, the cooling fluid circulates in loop through the first and second legs 12, 22 so that the heat released by the components of the powertrain 8, 10 is dissipated into the air by the second and fourth exchangers 4, 16. If the cooling requirements remain limited, the cooling fluid may pass through the bypass portion 20 rather than through the sub-leg 34. The cooling fluid also circulates through the third leg 28, in parallel with the first leg 12, in order to allow cooling of the refrigerant fluid at the bi-fluid exchanger 24.

Still in this mode of operation, the refrigerant fluid follows the sub-loop mentioned above. The fourth two-way valve 52 is open and said second and third expansion members 88 and 90 operate like an expansion valve. The first expansion member 76 is closed as are the fourth two-way valve 78 and the fifth two-way valve 86. The dissipation of heat performed by the bi-fluid exchanger 24 into the cooling fluid and by the first and third exchangers 2 and 6 into the air flow F1, allows, on the one hand, the cooling of the electrical energy storage device, using the cooler 14 and, on the other hand, the air conditioning of the vehicle interior, using the evaporator 58 which cools the air flow F2, notably in phases during which the vehicle is moving.

According to the mode of operation illustrated in FIG. 3, as already mentioned, the circuit provides a heat-pump mode, in this instance without cooling of the electrical storage device even though a heat-pump mode remains compatible with operational cooling of said storage device using the circuit illustrated.

In this mode of operation, the cooling fluid circulates in the first leg 12, the second leg 22, passing via the sub-leg 34, and in the third leg 28, and the fourth leg 30. The three-way valve 18 is open so as to cause the cooling fluid to circulate through the fourth exchanger 16, as explained above. The first two-way valve 38 and the second two-way valve 42 are open. The first and/or second pumps 32, 36 are active. Thus, the cooling fluid circulates in a loop in the third and the fourth leg 28 and 30 so that the heat transmitted by the bi-fluid exchanger 24 is dissipated into the air flow F2 by the heating radiator 26 to warm the vehicle interior. Circulation through the first leg 12 is in parallel with the circulation in the third leg 28, so as to recover the heat released by the components of the electric powertrain 8, 10. As an alternative, the circulation of the cooling fluid through the second leg 22 may be shut off, in this instance using said three-way valve 18.

Still in this mode of operation, the refrigerant fluid follows a different path than that of the sub-loop mentioned above. The third two-way valve 52 is closed as are said second and third expansion members 88 and 90. The first expansion member 76 operates as an expansion valve. The fourth two-way valve 78 and the fifth two-way valve 86 are open. Downstream of the compression device 50, the refrigerant fluid thus passes in succession through said bi-fluid exchanger 24, the fifth two-way valve 52, the first pass 56 of the internal exchanger 58, the first expansion member 76, said first exchanger 2, said sixth valve 86 and then the accumulator 60 and a second pass 62 of the internal exchanger 58. The first exchanger 2 therefore operates as an evaporator and collects heat from the air flow F1, which heat will be transmitted to the air flow F2 by the bi-fluid exchanger 24 and the heating radiator 26.

According to the mode of operation illustrated in FIG. 4, as already mentioned, the circuit provides rapid cooling of the energy storage device. Such operation generally occurs when the vehicle is stationary and the other cooling requirements or heating requirements are generally low.

In this mode of operation, the cooling fluid circulates in the second leg 22, passing via the portion 20, and in the third leg 28, but circulates through neither the first leg 12 nor the fourth leg 30. The three-way valve 18 is open so as to cause the cooling fluid to circulate through the portion 20, as explained above. The first two-way valve 38 is closed. The second two-way valve 42 is open. The first part 32 is inactive whereas the second pump 36 is active. In that way, the cooling fluid circulates in a loop through the second leg 12 and the third leg 28 so as to provide a minimum flow of cooling fluid through the bi-fluid exchanger 24 so that said cooling fluid does not begin to boil under the effect of the heat dissipated by the refrigerant fluid.

Still this mode of operation, the refrigerant fluid follows the same path as in the case of FIG. 2, namely the sub-loop mentioned above. The dissipation of heat performed by the bi-fluid exchanger 24 into the cooling fluid and by the first and the third exchangers 2 and 6 into the air flow F1 allows the rapid cooling of the energy storage device using the cooler 14.

Another aspect of the invention relates to a method for controlling a circuit for the thermal regulation of a vehicle. This may be the circuit described provided that it comprises said fourth exchanger 16 which is then qualified as an additional exchanger according to this aspect of the invention. That said, more broadly, said method may also apply to configurations without the third exchanger 6, the remainder of the circuit then advantageously remaining the same.

In the event of the absence of said third exchanger 6, said additional heat exchanger 16 preferably has a frontal surface area substantially equal to that of the first and/or second heat exchangers 2, 4.

According to this other aspect of the invention, said method comprises a step wherein a flow of heat-transfer fluid through the additional exchanger 16 is generated or increased according to the mode of operation of the circuit. In that way, whether or not a third exchanger 6 is available, this encourages the dissipation of heat by the cooling fluid by combining, where necessary, the second exchanger 4 and the additional exchanger 16, as is the case for example in the mode of operation of FIG. 2, in the way already seen, this being all the more effective when said additional heat exchanger 16 has ambient air flow passing through it.

More specifically, said method comprises a step of selectively allowing a circulation of the heat-transfer fluid through the second exchanger 4, without it passing through the additional exchanger 16, and a circulation of the heat-transfer fluid through the second exchanger 4 and through the additional heat exchanger 16. The heat dissipation power is thus modified according to the requirements.

As a preference, said method comprises a step of controlling at least one parameter relating to the heat-transfer fluid. This in particular is the temperature of the heat-transfer fluid.

The step in which the flow of the heat-transfer fluid in the additional exchanger 16 is generated or increased is performed on the basis of a value of said parameter, notably by comparing the value of the parameter against a threshold value.

By way of example, the step in which the flow of the heat-transfer fluid in the additional exchanger is generated or increased occurs if the temperature of the heat-transfer fluid is slightly below, equal to or greater than the maximum permissible temperature Tmax, Said step in which the flow of the heat-transfer fluid in the additional exchanger is generated or increased in this instance comprises a step of opening/closing said three-way valve 18, in an all-or-nothing mode and/or partially.

As illustrated in FIG. 5, the cooling fluid is cooled in the following sub-steps:

a sub-step (a) wherein said air flow is generated and/or accelerated using a motor-fan unit, and/or a sub-step (b) wherein a cross section for the passage of said air flow is increased by opening one or more mobile flaps or shutters intended to limit a flow rate of said air flow, a sub-step (c) wherein the flow of the heat-transfer fluid through said additional heat exchanger 16 is generated and/or increased.

Advantageously, the order of said sub-steps may moreover be modified according to the speed of the vehicle, notably according to the speed of the vehicle with respect to a threshold speed.

In particular, when the vehicle speed is above the threshold speed, there is an envisioned initial situation in which the flaps or shutters are closed so that the cross section for the passage of said air flow is nil or minimal.

When the vehicle speed is above the threshold speed, sub-step (c) is performed first of all, followed by sub-step (b) if that is still not enough to achieve a required setpoint. On the other hand, sub-step (a) has very little effect.

Successively, information about the vehicle is acquired in a first step 100. The flow rate and the temperature of the cooling fluid as well as the speed and the temperature of the air flow F1 are measured in a second step 102. Information on the refrigerant-fluid circulation loop is acquired in a third step 104 and then a test is performed to check that the temperature of the liquid coolant is above a setpoint, possibly incorporating a measurement uncertainty, in a fourth step 106.

If the result of the fourth step 106 is negative, the monitoring continues, looping back to the first step 100.

If the result of the fourth step 106 is positive, then a test is performed to check if a rotational speed of the motor-fan unit is a maximum speed, in a fifth step 108.

If the result of the fifth step 108 is negative, then the speed of the motor-fan unit is increased, this being done in a sixth step 110, and the monitoring continues, looping back to the first step 100.

If the result of the fifth step 108 is positive, then a test is performed to check whether the flaps or shutters are open to the maximum extent, in a seventh step 112.

If the result of the seventh step 112 is negative, then the extent to which the flaps or shutters are open is increased, this being done in an eighth step 114, and the monitoring continues, looping back to the first step 100.

If the result of the seventh step 112 is positive, then a test is performed to check whether the flow rate through the additional heat exchanger 16 is at a maximum, in a ninth step 116.

If the result is negative, then the flow rate through the additional heat exchanger 16 is increased, notably using the three-way valve 18 mentioned above, this being done in one or more tenth steps 118, and the monitoring continues, looping back to the first step 100.

In other words, when the vehicle is stationary and/or when the vehicle speed is below the threshold speed, sub-step (a) is performed first of all, and then, if that is still not enough to achieve the required setpoint, sub-step (b) is performed, and then, if that is still not enough to achieve the required setpoint, sub-step (c) is performed.

Using such a strategy the possibility of keeping the temperature of the cooling fluid below the maximum permissible temperature Tmax downstream of the converter 10 is optimized even under operating conditions such as operation at maximum power.

If such a result is not achieved, whether at high or at low speed, it is still possible to reduce the operating load of the refrigerant-fluid circulation loop, for example by limiting a maximum speed of the compression device 50.

This is illustrated in the embodiment of FIG. 5, for the case of the vehicle moving at low speed, and therefore in an eleventh step 120. The choice is then made as to whether to prioritize good operation of the vehicle air conditioning, in a twelfth step 122, or the cooling of the electrical storage device, in a thirteenth step 124. The circulation of the refrigerant fluid through the exchangers concerned is then adapted in a fourteenth step 126, following which the monitoring continues, looping back to the first step 100.

Advantageously, said threshold vehicle speed, namely the speed below or above which the order of steps (a), (b) and (c) varies, may be adjusted according to the ambient temperature.

The invention further relates to a heat exchange module, not illustrated, comprising the first, the second as well as the third heat exchanger 2, 4 and 6 and/or the fourth exchanger 16. Said module may furthermore advantageously comprise the three-way valve 18.

The module comprises, for example, a frame on which said first heat exchanger 2, second heat exchanger 4, third heat exchanger 6, fourth heat exchanger 16 and/or said three-way valve 18 are fixed. Said frame is configured to be fixed directly or indirectly to a chassis of the vehicle.

The invention claimed is:

1. A method for controlling a circuit for thermal regulation of a vehicle, the circuit comprising:
    a first and a second heat exchanger which are situated in series in a direction in which an air flow is intended to pass through each heat exchanger,
    an additional heat exchanger situated upstream of the first heat exchanger with respect to the air flow,
    wherein the circuit is configured to allow a refrigerant fluid to circulate through the first exchanger and also configured to allow a heat-transfer fluid to circulate through the second exchanger and through the additional exchanger,
    at least one valve configured to selectively direct the heat-transfer fluid directly towards the additional heat exchanger or directly towards the remainder of the circuit;
  the method comprising:
    generating or increasing a flow of the heat-transfer fluid in the additional exchanger according to the mode of operation of the circuit.

2. The method as claimed in claim 1, wherein said circuit is configured to pass the air flow through said additional heat exchanger yielding an ambient air flow.

3. The method as claimed in claim 1, further comprising:
    controlling at least one parameter relating to the heat-transfer fluid; and
    comparing a value of the at least one parameter against a threshold value,
      wherein the flow of the heat-transfer fluid in the additional exchanger is generated or increased.

4. The method as claimed in claim 1, wherein said circuit is configured so that the circulation of the heat-transfer fluid allows a cooling of an electric converter configured to convert a DC electric current delivered by an electrical storage device into an AC current for powering an electric motor capable of causing said vehicle to move.

5. The method as claimed in claim 4, further comprising: selectively allowing a circulation of the heat-transfer fluid through the second exchanger and a circulation of the heat-transfer fluid through the second exchanger and through the additional heat exchanger.

6. The method as claimed in claim 5, wherein said circuit comprises at least one valve for selectively directing the heat-transfer fluid downstream of the second exchanger, according to the direction of circulation of said heat-transfer fluid, toward said additional exchanger or toward a component or components of an electric powertrain of the vehicle.

7. The method as claimed in claim 1, wherein the circulation of the heat-transfer fluid through the second heat exchanger and through the additional heat exchanger is in series.

8. The method as claimed in claim 1, wherein said first and second heat exchangers as well as said additional exchanger are configured to be positioned on the vehicle.

9. The method as claimed in claim 1, wherein a cooling fluid is cooled in sub-steps as follows:
    whereby sub-step (a) comprises generating and/or accelerating air flow; and/or,
    whereby sub-step (b) comprises increasing said air flow by opening one or more mobile flaps or shutters intended to limit the flow rate of said air flow; and/or,
    whereby sub-step (c) comprises generating and/or increasing the flow of the heat-transfer fluid through said additional heat exchanger; and wherein the order of said sub-steps is modified according to the speed of the vehicle.

10. The method as claimed in claim 9, wherein, when the vehicle speed is above a threshold speed, the flaps or shutters are closed so said air flow is decreased to nil or minimal.

* * * * *